S. GISSINGER.
Churn.
No. 25,502
Patented Sept. 20, 1859.
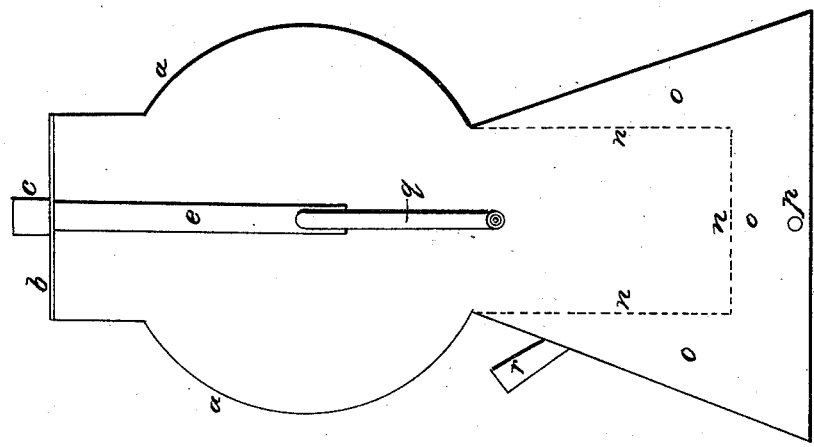
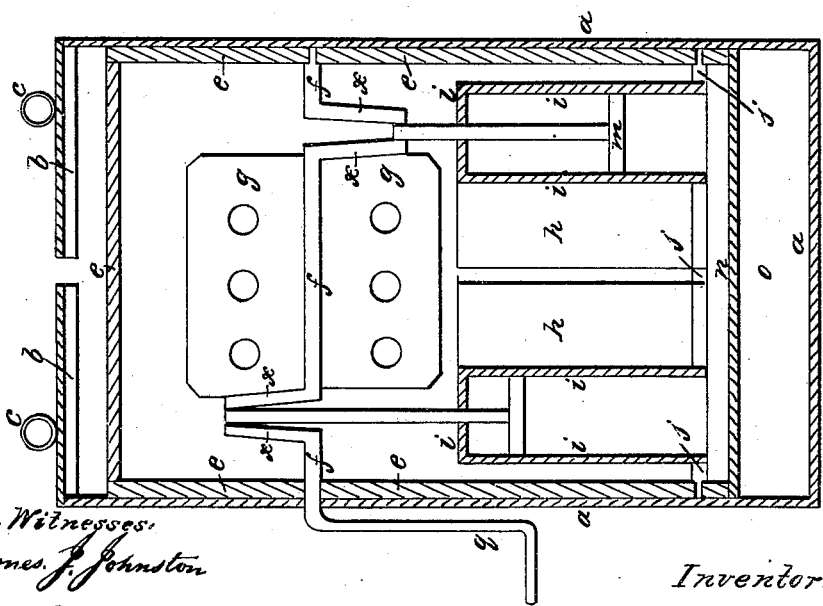
Witnesses:
James J. Johnston
Henry Fortney.
Inventor:
Samuel Gissinger.

UNITED STATES PATENT OFFICE.

SAMUEL GISSINGER, OF ALLEGHENY, PENNSYLVANIA.

CHURN.

Specification of Letters Patent No. 25,502, dated September 20, 1859.

*To all whom it may concern:*

Be it known that I, SAMUEL GISSINGER, of the city and county of Allegheny, in the State of Pennsylvania, have invented a new and Improved Churn; and I do hereby declare that the following is a full and exact description thereof, reference being had to the accompanying drawings and to the letters of reference marked thereon.

The nature of my invention consists in an arrangement of oscillating churns furnished with dashers and wings, in combination with a revolving shaft armed with wings, the whole being arranged in a frame and placed in a case, and operating in the manner hereinafter described.

To enable others skilled in the art to make and use my invention, I will proceed to describe its construction and operation.

In the accompanying drawings, Figure 1, is a cut or sectional view of the churn. Fig. 2, is an end view of the churn.

(*a*) is the outside case, (*b*) is the lid, (*c*) are the handles of the lid, (*e*) is a movable frame which is held in its place by guides which are placed on the ends of case (*a*), (*f*) is the revolving shaft, (*j*) is the oscillating shaft, (*i*) are the oscillating churns which are secured to the shaft (*j*), (*h*) are wings which are secured to the churns (*i*) and shaft (*j*), (*m*) are the dashers of the churns (*i*), (*l*) are the stems of dashers (*m*) and are secured to the cranks (*x*) of shaft (*f*), (*g*) are wings which are secured to the shaft (*f*), (*n*) represents the inner bottom and sides of case (*a*) which in connection with the outside casing forms a water chamber marked (*o*), (see Fig. 2), (*r*) is a supply pipe for the water chamber (*o*). (*p*) is the exit opening of the water chamber, (*q*) is the crank to which the power is applied.

The operation of my improved churn is as follows: Having all things arranged as represented in Fig. 1 of the drawings, the milk or cream is put in the case (*a*), and warm or cold water as the case may require is put in the chamber (*o*) at pipe (*r*) the exit opening being closed with a suitable stopple. And now by turning crank (*q*) which will revolve the shaft (*f*) with its wings (*g*), and also operate the dashers (*m*) and give to the churns (*i*) and their wings (*h*) an oscillating motion; thereby churning and agitating the milk or cream so as to produce butter, which is gathered and cured in the ordinary manner.

Having thus described the nature construction and operation of my improved churn, what I claim as of my invention and desire to secure by Letters Patent of the United States is.

The arrangement in the movable frame (*e*) of the oscillating churns (*i*) furnished with dashers (*m*) and wings (*h*), in combination with the revolving shaft (*f*) armed with wings (*g*), the whole being arranged and combined as herein described and represented, and for the purpose set forth.

SAMUEL GISSINGER.

Witnesses:
   JAMES J. JOHNSTON,
   HENRY FORTNEY.